United States Patent
Okabayashi et al.

(10) Patent No.: US 11,283,268 B2
(45) Date of Patent: Mar. 22, 2022

(54) CHARGER, CHARGING SYSTEM, AND METHOD FOR CONTROLLING CHARGE CURRENT

(71) Applicant: MAKITA CORPORATION, Anjo (JP)

(72) Inventors: Hisakazu Okabayashi, Anjo (JP); Masaya Mizutani, Anjo (JP); Makoto Ito, Anjo (JP)

(73) Assignee: MAKITA CORPORATION, Anjo (JP)

( * ) Notice: Subject to any disclaimer, the term of this patent is extended or adjusted under 35 U.S.C. 154(b) by 69 days.

(21) Appl. No.: 17/010,103

(22) Filed: Sep. 2, 2020

(65) Prior Publication Data

US 2021/0075233 A1 Mar. 11, 2021

(30) Foreign Application Priority Data

Sep. 9, 2019 (JP) .............................. JP2019-163762

(51) Int. Cl.
*H02J 7/00* (2006.01)
*H02J 7/04* (2006.01)

(52) U.S. Cl.
CPC ........ *H02J 7/00032* (2020.01); *H02J 7/0049* (2020.01); *H02J 7/04* (2013.01); *H02J 7/00714* (2020.01)

(58) Field of Classification Search
CPC .................................. H02J 7/00032

USPC ......................................................... 320/138
See application file for complete search history.

(56) References Cited

U.S. PATENT DOCUMENTS

| | | | | |
|---|---|---|---|---|
| 2010/0138072 A1* | 6/2010 | Wang | .................... | H02J 7/0013 700/298 |
| 2020/0086753 A1* | 3/2020 | Hou | ........................ | B60L 53/35 |
| 2020/0106286 A1* | 4/2020 | Tian | ...................... | H02J 7/0047 |
| 2020/0379536 A1* | 12/2020 | Hsieh | ........................ | H02J 9/06 |

FOREIGN PATENT DOCUMENTS

JP  2001-245436 A  9/2001

* cited by examiner

*Primary Examiner* — Yalkew Fantu
(74) *Attorney, Agent, or Firm* — Oliff PLC

(57) ABSTRACT

A charger according to one aspect of the present disclosure includes a current outputter, a first charge controller, and a second charge controller. The first charge controller receives a first required information from a first device in accordance with a first communication protocol. The first communication protocol requires at least a first minimum volume of communication to acquire the first required information from the first device. The second charge controller receives a second required information from a second device in accordance with a second communication protocol. The second communication protocol requires at least a second minimum volume of communication to acquire a second required information from the second device. The second minimum volume is smaller than the first minimum volume.

15 Claims, 7 Drawing Sheets

CHARGER, CHARGING SYSTEM, AND METHOD FOR CONTROLLING CHARGE CURRENT

CROSS-REFERENCE TO RELATED APPLICATIONS

The present application claims the benefit of Japanese Patent Application No. 2019-163762 filed on Sep. 9, 2019 with the Japan Patent Office, and the entire disclosure of which is incorporated herein by reference.

BACKGROUND

The present disclosure relates to a charger, a charging system, and a method for controlling a charge current.

Japanese Unexamined Patent Application Publication No. 2001-245436 discloses a charging system for charging a battery pack. The charging system includes a charger and an adapter. The adapter is configured to transmit type information indicating the type of the battery pack. The adapter is connected between the charger and the battery pack, and transmits the type information to the charger. In this charging system, the adapter transmits the type information to the charger in the place of the battery pack. This enables suitable charging of battery packs that cannot transmit their type information.

SUMMARY

In the above-described charging system, while it is possible to transmit the type information to the charger, the magnitude of a charge current may not be suitably controlled due to a delay in controlling the charge current in the charger.

Battery packs have respective adjustment cycles for suitably adjusting the magnitudes of charge currents. The adjustment cycles differ depending on the types and the characteristics of battery packs. The adjustment cycles also depend on the specifications and/or the performance of chargers, and thus may be short in some cases and long in others.

In chargers with long adjustment cycles, delays are caused in the magnitudes of charge currents and thus it may not be possible to suitably charge battery packs that require short adjustment cycles. Moreover, battery packs may be damaged if a change in the magnitude of the charge current delays while a large charge current is flowing.

It is desirable that one aspect of the present disclosure provides a technique to suitably change the magnitude of a charge current depending on the type of the battery pack.

A charger according to one aspect of the present disclosure includes a current outputter, a first charge controller, and/or a second charge controller.

The current outputter selectively outputs either a first charge current or a second charge current to an electric device connected to the charger.

The first charge controller controls the first charge current in response to the electric device being a first device. The first charge controller receives a first required information from the first device in accordance with a first communication protocol. The first required information includes a first required value. The first required value corresponds to a magnitude of the first charge current required by the first device. The first communication protocol defines a first digital communication. The first communication protocol requires at least a first minimum volume (or amount) of communication to acquire the first required information from the first device.

The second charge controller controls the second charge current in response to the electric device being a second device. The second charge controller receives a second required information from the second device in accordance with a second communication protocol. The second required information includes a second required value. The second required value corresponds to a magnitude of the second charge current required by the second device. The second communication protocol is different from the first communication protocol. The second communication protocol defines a second digital communication. The second communication protocol requires at least a second minimum volume (or amount) of communication to acquire the second required information from the second device. The second minimum volume is smaller than the first minimum volume.

The above-described charger uses the second communication protocol to acquire the second required information from the second device. Thus, the volume of information that needs to be transmitted and received can be reduced as compared with the case in which the first communication protocol is used. Accordingly, the time for the charger to acquire the second required information from second device can be reduced as compared with the time for the charger to acquire the first required information from the first device.

When outputting the second charge current to the second device, the charger can change the magnitude of the second charge current in a shorter cycle as compared with when the charger outputs the first charge current to the first device.

Thus, if the second device needs to change the magnitude of the second charge current in a cycle shorter than for the first device, the charger can suitably change the magnitude of the second charge current. As a result, the charger can output the second charge current with a suitable magnitude to the second device.

The charger may include a device identifier. The device identifier may identify, in accordance with the first communication protocol, the electric device electrically connected to the charger. The first charge controller may control the first charge current in response to the device identifier identifying the electric device as the first device. The second charge controller may control the second charge current in response to the device identifier identifying the electric device as the second device.

The above-described charger can control the first charge current or the second charge current based on identification of the electric device determined by the device identifier depending on the type of the electric device.

The first communication protocol may define that the charger is assigned as a primary (or leader) and the electric device is assigned as a secondary (or follower). The primary may be defined to control the secondary. The secondary may be defined to operate in accordance with the primary.

The second communication protocol may define that the charge is assigned as the secondary and the second device is assigned as the primary.

Use of the above-described charger enables transmission of the second required information from the second device (i.e., primary) to the charger (i.e., secondary) without making an inquiry on the second required information from the charger to the second device. In other words, since the second required information can be acquired without inquiring the second device, it is possible to reduce the time for the charger to acquire the second required information and to increase the frequency to acquire the second required information in per unit time.

Due to the above-described charger, the increase in the frequency of acquisition of the second required information in per unit time enables prompt change in the magnitude of the second charge current. This inhibits a delay in controlling the magnitude of the second charge current in response to a change in the state of the second device.

The first charge controller may control the current outputter such that the magnitude of the first charge current reaches the first required value. The above-described charger can feed the first device with the first charge current having a magnitude that corresponds to the first required value.

The charger may include a completion determiner configured to determine whether a charge completion condition may be fulfilled based on the first required information. The charge completion condition may be fulfilled in response to the first required value being smaller than a charge completion value. The charge completion value corresponds to the magnitude of the first charge current by which charging performed by the charger is determined to be completed.

The above-described charger can determine whether charging of the first device is completed based on a comparison between the first required value and the charge completion value.

The current outputter may convert alternating-current power into direct-current power to generate either the first charge current or the second charge current. The above-described charger can charge either the first device or the second device with the alternating-current power.

The electric device may include a device controller configured to control the electric device. The charger may include a power source configured to supply an electric power to the device controller. The above-described charger can supply an electric power to the device controller of the electric device.

The charger may include terminals configured to be electrically connected to the electric device. The above-described charger can be electrically connected to the electric device through the terminals.

The charging system according to another aspect of the present disclosure may include an adapter in addition to the above-described charger. The adapter may be electrically connected to the charger and a third device. The adapter may be assigned as the second device. The adapter may output the second charge current outputted from the charger to the third device.

In the above-described charging system, use of the adapter enables the charger to charge the third device even if the third device is unable to perform the first digital communication and the second digital communication.

The first device may include a first battery configured to output the first required information in accordance with the first communication protocol. The third device may include a second battery.

The adapter may include an information receiver and/or an information outputter. The information receiver may receive the second required value from the third device. The information outputter may output the second required information to the charger in accordance with the second communication protocol. The second required information may include the second required value received by the information receiver.

In the above-described charging system, the first battery can be charged through a direct connection with the charger, and the second battery can be charged via the adapter.

Accordingly, the above-described charging system can charge both the first battery and the second battery that are different types of batteries from each other.

The information receiver may receive an analog signal indicating the second required value.

The second required value is reflected to the above-described analog signal in real time. This enables the information receiver to promptly receive the second required value from the second battery. Moreover, the information outputter outputs information on the second required value to the charger based on the second required value received by the information receiver. This enables transmission of the second required value to the charger.

In the above-described charging system, the second required value can be transmitted in a short term from the second battery to the charger through the adapter, which enables update of the output value for the second charge current in the charger at short time intervals.

Generally in digital communication, update of the second required value in a short term may be difficult, since setting the data transmission cycle short increases processing load in the data transmission process. In contrast, the analog signal enables update of the second required value in a short term.

Still another aspect of the present disclosure provides a method for controlling a charge current, the method comprising: receiving a first required information from a first device in accordance with a first communication protocol in response to the first device being connected to a charger, the first required information including a first required value, the first required value corresponding to a magnitude of a first charge current required by the first device, and the first communication protocol defining a first digital communication and requiring at least a first minimum volume of communication to acquire the first required information from the first device; receiving a second required information from a second device in accordance with a second communication protocol in response to the second device being connected to the charger, the second required information including a second required value, the second required value corresponding to a magnitude of a second charge current required by the second device, the second communication protocol being different from the first communication protocol, the second communication protocol defining a second digital communication, the second communication protocol requiring at least a second minimum volume of communication to acquire the second required information from the second device, and the second minimum volume being smaller than the first minimum volume; and/or selectively outputting, from the charger, either the first charge current based on the first required value or the second charge current based on the second required value.

The above-described method achieves the same effects as those of the above-described charger.

BRIEF DESCRIPTION OF THE DRAWINGS

Example embodiments of the present disclosure will be described hereinafter by way of example with reference to the accompanying drawings, in which.

DETAILED DESCRIPTION OF EXEMPLARY EMBODIMENTS

The present disclosure is not limited to embodiments below and may be variously modified within the technical scope of the present disclosure.

1. First Embodiment

1-1. Overall Configuration

Configuration of a charger 600 and a charging system 1 according to the present embodiment will be described with reference to FIGS. 1 and 2.

Figure 1:
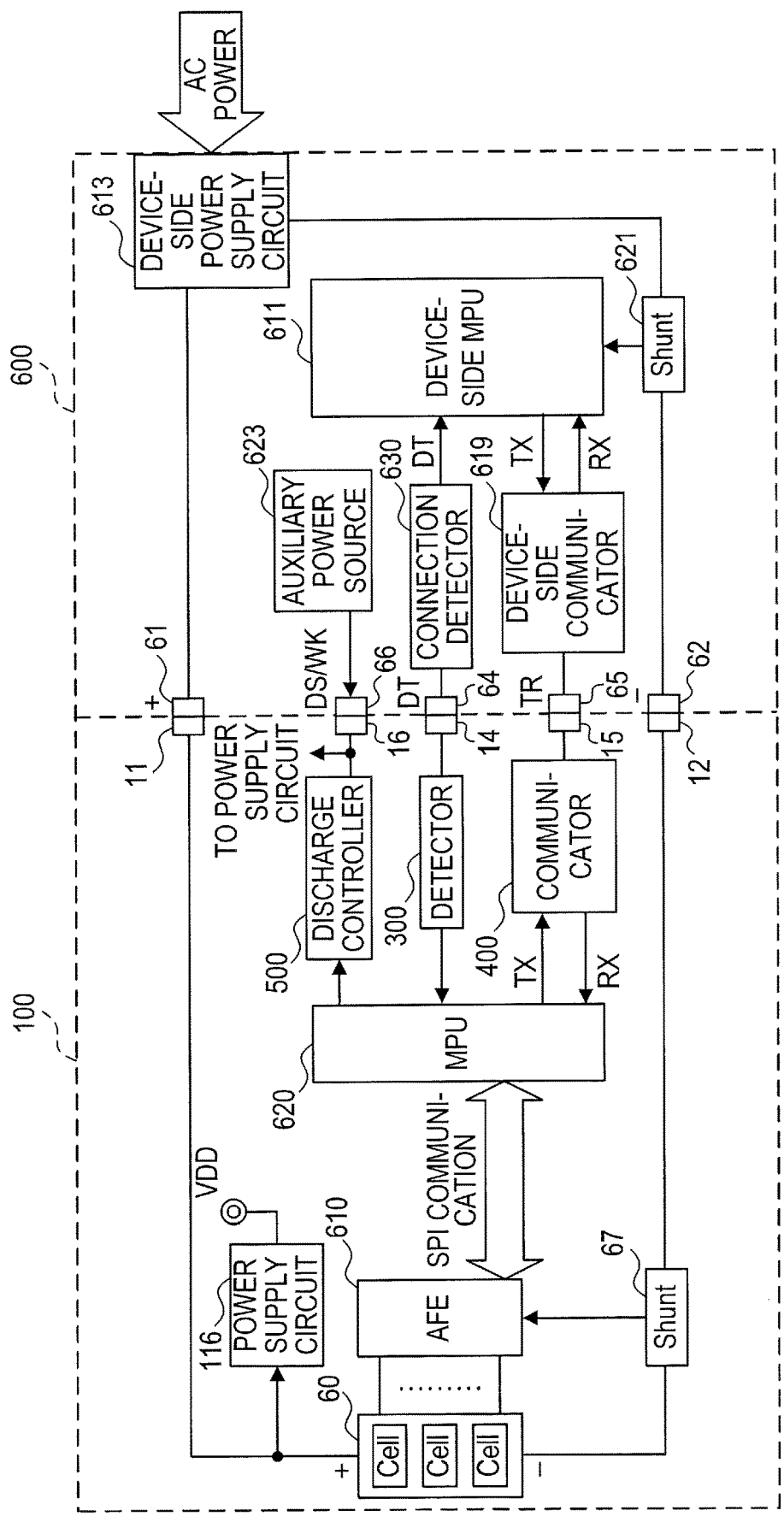
FIG. 1 is a block diagram showing an overview of a first battery pack and a charger.

As shown in FIG. 1, the charger 600 is configured to be connected to a first battery pack 100. The charger 600 charges the first battery pack 100 connected thereto.

Figure 2:
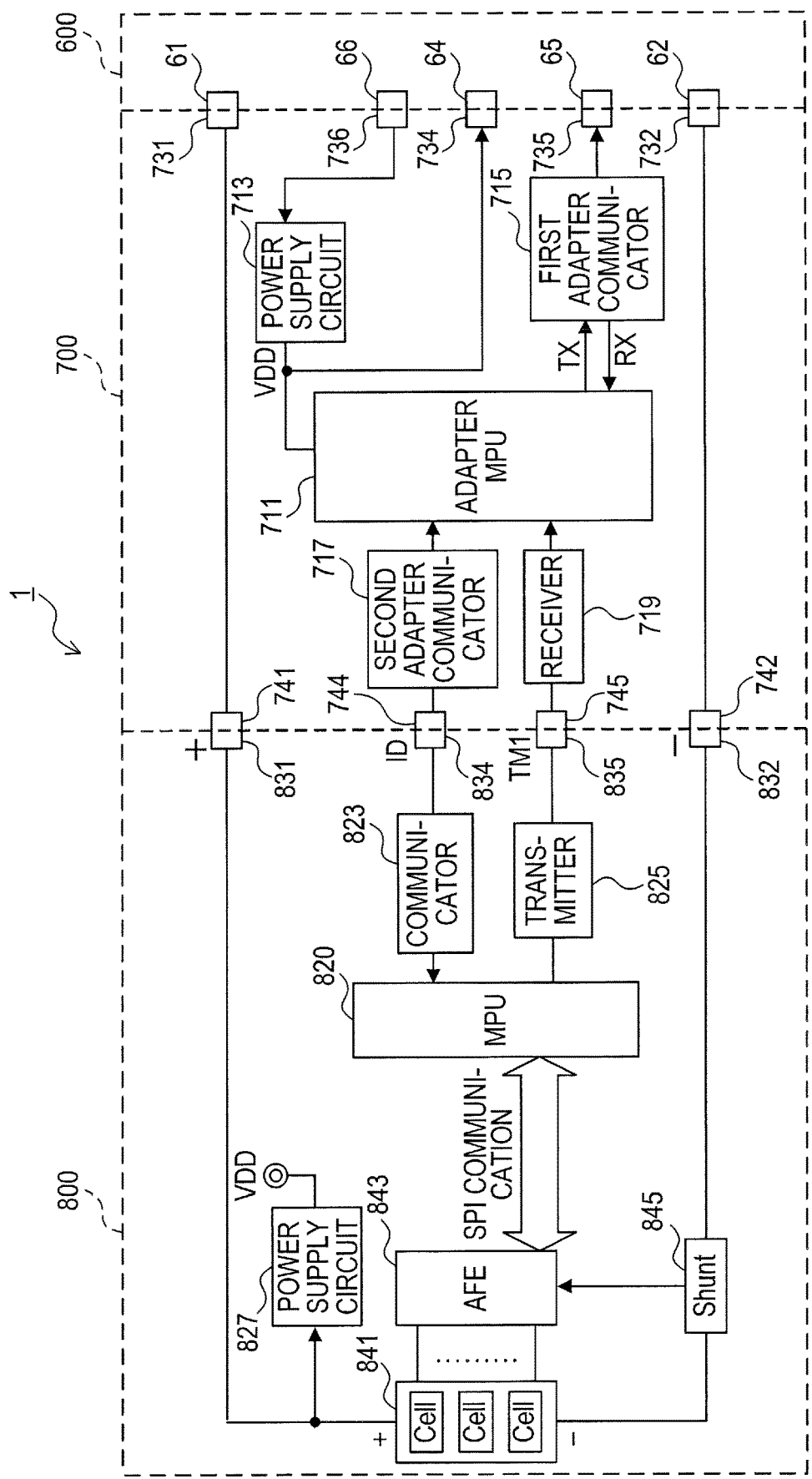
FIG. 2 is a block diagram showing an overview of a second battery pack, an adapter, and the charger.

As shown in FIG. 2, the charging system 1 includes the charger 600 and an adapter 700. The adapter 700 is connected to the charger 600 and a second battery pack 800. The adapter 700 outputs a second charge current from the charger 600 to the second battery pack 800.

That is, the charging system 1 is configured to be connected to the second battery pack 800. The charging system 1 charges the second battery pack 800 connected thereto. In other words, the charging system 1 is configured such that the charger 600 is connected to the second battery pack 800 via the adapter 700.

1-2. Charger and First Battery Pack

The configuration of the charger 600 will be described with reference to FIG. 1.

The charger 600 includes a device-side Micro Processing Unit (MPU) 611, a device-side power supply circuit 613, a device-side communicator 619, a shunt resistor 621, an auxiliary power source 623, and a connection detector 630. The charger 600 further includes a device-side positive terminal 61, a device-side negative terminal 62, a device-side DT terminal 64, a device-side TR terminal 65, and a device-side DS terminal 66.

The device-side MPU 611 includes a microcomputer including a CPU, a ROM, a RAM, and Input/Output (I/O) ports, and executes various control processes including a charge control process of the charger 600. The device-side power supply circuit 613 is a power source that supplies a DC (direct-current) power. The device-side power supply circuit 613 converts an AC (alternating-current) power from a commercial power source (100 V AC, for example) into a DC power by an AC/DC converter or other devices and supplies the DC power. The device-side power supply circuit 613 selectively outputs either a first charge current or the second charge current to an electric device connected to the charger 600. The device-side communicator 619 includes a half-duplex Universal Asynchronous Receiver/Transmitter (UART) circuit.

The device-side positive terminal 61 and the device-side negative terminal 62 are electrically connected to the device-side power supply circuit 613. The device-side DT terminal 64 is connected to the connection detector 630. The device-side TR terminal 65 is connected to the device-side communicator 619. The device-side DS terminal 66 is connected to the auxiliary power source 623.

The device-side positive terminal 61, the device-side negative terminal 62, the device-side DT terminal 64, the device-side TR terminal 65, and the device-side DS terminal 66 are respectively connected to a positive terminal 11, a negative terminal 12, a DT terminal 14, a TR terminal 15, and a DS terminal 16, which will be described later, in response to the first battery pack 100 being connected to the charger 600.

The shunt resistor 621 is disposed in a current path connecting the device-side power supply circuit 613 and the device-side negative terminal 62. The device-side MPU 611 detects, through the shunt resistor 621, the magnitude of a discharge current flowing out of the device-side power supply circuit 613.

The first battery pack 100 is connected to a first external device to supply an electric power to the first external device. Examples of the first external device include electric working machines, and lighting devices. Electric working machines and lighting devices are operated upon being supplied with an electric power. Examples of electric working machines include electric power tools, such as hammer drills and grinders, and gardening tools, such as grass cutters, hedge trimmers, trimmers, and chainsaws. The first battery pack 100 is also connected to a second external device to be supplied with an electric power from the second external device. Examples of the second external device include the charger 600.

As shown in FIG. 1, the first battery pack 100 is connected to the charger 600 to be supplied with an electric power from the charger 600.

The first battery pack 100 includes a battery 60, an Analog Front End (AFE) 610, a Micro Processing Unit (MPU) 620, a power supply circuit 116, and a shunt resistor 67.

The first battery pack 100 further includes the positive terminal 11, the negative terminal 12, the DT terminal 14, the TR terminal 15, the DS terminal 16, a detector 300, a communicator 400, and a discharge controller 500.

The battery 60 includes battery cells connected in series. The battery 60 is a rechargeable battery and is, for example, a lithium ion battery. The battery 60 according to the present embodiment has a rated voltage of, for example, 18 V. The rated voltage of the battery 60, however, is not limited to 18 V and may be, for example, 36 V or 72 V. The battery 60 is charged with the first charge current from the charger 600 connected to the first battery pack 100. The battery 60 may include battery cells connected in parallel. The capacity of the battery 60 may be increased in this way. The battery 60 may include branches connected in parallel, and each of the branches may include battery cells connected in series.

The MPU 620 includes a microcomputer including a CPU, a ROM, a RAM, and I/O ports, and executes various control processes including charge and discharge control processes of the battery 60. The MPU 620 also includes interruption ports PI (not shown) through which various signals are inputted. Upon (i) detection of a connection to the charger 600 by the detector 300 and (ii) fulfillment of a specified condition, the MPU 620 changes its operation mode from a normal operation mode (or controlled operation state) to a sleep mode (or low power operation state). In the sleep mode, a part of operation is stopped to reduce power consumption. When any one of the interruption ports PI receives a signal during the sleep mode, the MPU 620 activates and enters the normal operation mode. For example, the MPU 620 activates upon (i) detection of a connection to the charger 600 by the detector 300 and (ii) an input of a connection detected information Sa1 through the interruption port PI. The MPU 620 enters the sleep mode upon (i) detection of removal of the charger 600 and (ii) fulfillment of a specified condition.

In other words, the MPU 620 can be switched to one of operation modes (or operation states) including the normal operation mode and the sleep mode. In the controlled operation state, charge and discharge of the battery 60 is controlled. In the low power operation state, charge and discharge of the battery 60 is not controlled, and power consumption is smaller than that in the controlled operation state.

The AFE 610 is an analog circuit. The AFE 610 detects the cell voltage of each of the battery cells of the battery 60 in accordance with a command from the MPU 620, and detects the cell temperature of at least one of the battery cells through a thermistor (not shown) of the battery 60. The AFE 610 executes a cell balancing process to even out remaining energies of the battery cells. The AFE 610 detects the temperature of a circuit board (hereinafter also referred to as circuit board temperature) through another thermistor (not shown) on the circuit board. Further, the AFE 610 detects, through the shunt resistor 67, the first charge current flowing into the battery 60 and a discharge current flowing out of the battery 60. The AFE 610 converts detection values of the detected cell voltages, the cell temperature, the circuit board temperature, the charge current and the discharge current into respective digital signals and outputs the digital signals to the MPU 620.

The shunt resistor 67 is disposed in a current path connecting the battery 60 and the negative terminal 12.

The power supply circuit 116 includes a regulator. The regulator is supplied with an electric power from the auxiliary power source 623 of the charger 600 through the DS terminal 16 during a shutdown state of the first battery pack 100 (specifically, the MPU 620). The power supply circuit 116 generates a power supply voltage VDD used for operating internal circuits of the first battery pack 100.

The first battery pack 100 shuts down when being overly discharged. The MPU 620 activates from the shutdown state upon receipt of the power supply voltage VDD generated by the power supply circuit 116, and outputs a charge enabling signal to the charger 600 if the battery 60 is in a rechargeable state. When the battery voltage reaches a specified voltage, the battery 60 supplies the power supply circuit 116 with an electric power. The power supply circuit 116 generates the power supply voltage VDD upon being supplied with the electric power from the battery 60.

The MPU 620 determines the state of the battery 60 based on various signals inputted thereto. Based on the determined state of the battery 60, the MPU 620 determines whether to enable or disable discharge from the battery 60, and generates a discharge enabling signal or a discharge disabling signal to output the signal to the discharge controller 500. To improve responsiveness to the first external device (specifically, the electric working machine), the MPU 620 may continue generating the discharge enabling signal and outputting the discharge enabling signal to the discharge controller 500 during the sleep mode.

When the first battery pack 100 is connected to the first external device (not shown) or the charger 600, the positive terminal 11 and the negative terminal 12 are respectively connected to a device-side positive terminal and a device-side negative terminal of the first external device, or the device-side positive terminal 61 and the device-side negative terminal 62 of the charger 600.

Such connections allow an electric power to be supplied from the first battery pack 100 to the first external device, or from the charger 600 to the first battery pack 100.

The DT terminal 14 is connected to the device-side DT terminal 64 of the charger 600 when the first battery pack 100 is connected to the charger 600. The DT terminal 14 and the DT terminal 64 have an electric potential VDT. The electric potential VDT varies depending on whether the charger 600 is in an unconnected state or in a connected state. The electric potential VDT also varies depending on whether the first battery pack 100 is in the shutdown state or in a non-shutdown state.

The connection detector 630 determines whether the electric potential VDT indicates the shutdown state of the first battery pack 100 or the non-shutdown state. Based on the result of the determination, the connection detector 630 detects whether the first battery pack 100 is in the shutdown state.

The DT terminal 14 is connected to the detector 300 of the first battery pack 100. The detector 300 detects the electric potential VDT of the DT terminal 14, and determines, based on the detected electric potential VDT, whether the charger 600 is not connected to the first battery pack 100. The detector 300 outputs the result of detection to the MPU 620 through the interruption port PI (not shown). The detector 300 may output the detection result to the AFE 610. The detector 300 may output the detection result to the MPU 620 and the AFE 610.

Based on the inputted detection result, the MPU 620 acquires a device information including an unconnected state information, an OFF-state information, and an ON-state information. The device information is transmitted from the charger 600 to the first battery pack 100 and received by the first battery pack 100.

The unconnected state information indicates that the charger 600 is not connected to the first battery pack 100. The OFF-state information indicates that the charger 600 is connected to the first battery pack 100. The ON-state information indicates that the charger 600 is connected to the first battery pack 100.

The TR terminal 15 is connected to the communicator 400 for serial communication. The communicator 400 includes a half-duplex Universal Asynchronous Receiver/Transmitter (UART) circuit.

After charging of the first battery pack 100 is completed and the first battery pack 100 is removed, the device-side MPU 611 maintains a normal operation mode (or controlled operation state). In other words, the device-side MPU 611 continuously monitors whether the first battery pack 100 is connected.

In order to reduce standby power, the device-side MPU 611 may change its operation mode from the normal operation mode to a sleep mode (or low power operation state) upon (i) completion of charging of the first battery pack 100, (ii) detection of removal of the first battery pack 100, and (iii) fulfillment of the specified condition. In the sleep mode, a part of the operation is stopped to reduce the power consumption. In this case, before changing the operation mode from the normal operation mode to the sleep mode, the device-side MPU 611 transmits a sleep mode transition signal Sa2 to the MPU 620 through the device-side communicator 619. The sleep mode transition signal Sa2 indicates that the device-side MPU 611 of the charger 600 has entered the sleep mode.

The above-described device-side MPU 611 may activate upon any one of the interruption ports PI receiving a signal during the sleep mode, and may enter the normal operation mode. For example, the device-side MPU 611 may activate upon detection of the connection to the first battery pack 100 and receipt of a connection detected information Sb1 through the interruption port PI. The device-side MPU 611 may enter the sleep mode if (i) removal of the first battery pack 100 is detected prior to completion of charging and (ii) the specified condition is fulfilled.

The MPU 620 and device-side MPU 611 execute the serial communication through the communicator 400, the TR terminal 15, the device-side TR terminal 65, and the device-side communicator 619. While the communication connection is established, the MPU 620 and the device-side MPU 611 communicate with each other in every communication cycle Tc (for example, Tc=4 [sec]) which is determined in advance. The MPU 620, the communicator 400, and the TR terminal 15 function as the communicator configured to perform bidirectional communication with the charger 600.

The DS terminal 16 is connected to a discharge controller 500. If the first battery pack 100 is connected to the first external device (specifically, the electric working machine), the DS terminal 16 outputs the discharge enabling signal or the discharge disabling signal to the first external device. The discharge controller 500 outputs the discharge enabling signal or the discharge disabling signal through the DS terminal 16 based on the discharge enabling signal or the discharge disabling signal inputted from the MPU 620. If the first battery pack 100 in the shutdown state is connected to the charger 600, the DS terminal 16 receives an electric power from the auxiliary power source 623 through the device-side DS terminal 66.

1-3. Charging System and Second Battery Pack

The configuration of the charging system 1 will be described with reference to FIG. 2.

The charging system 1 includes the charger 600 and the adapter 700. The charging system 1 is configured to be connected to the second battery pack 800. The charging system 1 charges the second battery pack 800 connected thereto. More specifically, the charging system 1 is configured such that the charger 600 is connected to the second battery pack 800 through the adapter 700.

The charger 600 is configured as described above. Accordingly, the charger 600 is depicted in simplified manner in FIG. 2 and the details of the charger 600 are not repeated here.

As shown in FIG. 2, the adapter 700 is connected to the charger 600. The adapter 700 is connected to the second battery pack 800. The adapter 700 outputs the second charge current from the charger 600 to the second battery pack 800.

The adapter 700 includes an adapter Micro Processing Unit (MPU) 711, a power supply circuit 713, a first adapter communicator 715, a second adapter communicator 717, and a receiver 719. The adapter 700 further includes a first positive terminal 731, a first negative terminal 732, a first DT terminal 734, a first TR terminal 735, and a first DS terminal 736. The adapter 700 further includes a second positive terminal 741, a second negative terminal 742, an ID terminal 744, and a TM1 terminal 745.

When the adapter 700 is connected to the charger 600, the first positive terminal 731, the first negative terminal 732, the first DT terminal 734, the first TR terminal 735, and the first DS terminal 736 are respectively connected to the device-side positive terminal 61, the device-side negative terminal 62, the device-side DT terminal 64, the device-side TR terminal 65, and the device-side DS terminal 66. When the adapter 700 is connected to the second battery pack 800, the second positive terminal 741, the second negative terminal 742, the ID terminal 744, and the TM1 terminal 745 are respectively connected to a second battery positive terminal 831, a second battery negative terminal 832, a battery ID terminal 834, and a battery TM1 terminal 835 which will be described later.

The adapter MPU 711 includes a microcomputer including a CPU, a ROM, a RAM, and I/O ports, and executes various control processes of the adapter 700.

The power supply circuit 713 includes a regulator. When the adapter 700 is connected to the charger 600, the power supply circuit 713 is supplied with an electric power from the auxiliary power source 623 of the charger 600 through the first DS terminal 736. The power supply circuit 713 generates a power supply voltage VDD used for operating internal circuits of the adapter 700. The adapter MPU 711 activates from a shutdown state in response to receipt of the power supply voltage VDD generated by the power supply circuit 713.

The first adapter communicator 715 is connected to the adapter MPU 711 and the first TR terminal 735. The first adapter communicator 715 includes a half-duplex Universal Asynchronous Receiver/Transmitter (UART) circuit. The first TR terminal 735 is connected to the first adapter communicator 715 for serial communication.

The second adapter communicator 717 is connected to the adapter MPU 711 and the ID terminal 744. The second adapter communicator 717 includes a communication circuit that performs a communication control in accordance with an adapter communication protocol. The adapter communication protocol defines to perform a primary-secondary (or leader-follower) type communication, and the communication procedure thereof is simple as compared with that defined in a Universal Asynchronous Receiver Transmitter (UART) communication protocol. The ID terminal 744 is connected to the second adapter communicator 717 for communication.

The receiver 719 is connected to the adapter MPU 711 and the TM1 terminal 745. The receiver 719 receives information represented by analog voltage. The TM1 terminal 745 is connected to the receiver 719 for receiving analog voltage.

Similarly to the first battery pack 100, the second battery pack 800 is connected to the first external device and supplies an electric power to the first external device. The second battery pack 800 is also connected to the second external device and is supplied with an electric power from the second external device.

As shown in FIG. 2, the second battery pack 800 is connected to the charger 600 through the adapter 700 to be supplied with an electric power from the charger 600.

The second battery pack 800 includes a second battery 841, an Analog Front End (AFE) 843, a Micro Processing Unit (MPU) 820, a communicator 823, a transmitter 825, a power supply circuit 827, and a shunt resistor 845. The second battery pack 800 further includes the second battery positive terminal 831, the second battery negative terminal 832, the battery ID terminal 834, and the battery TM1 terminal 835.

The second battery 841 includes battery cells connected in series. The second battery 841 is a rechargeable battery and is, for example, a lithium ion battery. The second battery 841 according to the present embodiment has a rated voltage of, for example, 18 V. The rated voltage of the second battery 841 however is not limited to 18 V and may be, for example, 36 V or 72 V. The second battery 841 may include battery cells connected in parallel. The capacity of the second battery 841 may be increased in this way. The second battery 841 may include branches connected in parallel, and each of the branches may include battery cells connected in series.

The MPU 820 includes a microcomputer including a CPU, a ROM, a RAM, and I/O ports, and executes various control processes including charge and discharge control processes of the second battery 841. The MPU 820 may include interruption ports PI (not shown) through which various signals are inputted.

The communicator 823 is connected to the MPU 820 and the battery ID terminal 834. The communicator 823 includes a communication circuit that performs communication control in accordance with the above-described adapter communication protocol. The battery ID terminal 834 is connected to the communicator 823 for communication.

The transmitter 825 is connected to the MPU 820 and the battery TM1 terminal 835. The transmitter 825 outputs an information voltage Vtm that is an analog voltage. The information voltage Vtm indicates information such as a second required current Irs which will be described later. The battery TM1 terminal 835 is connected to the transmitter 825 for analog voltage transmission.

The AFE 843 is an analog circuit. The AFE 843 detects the cell voltage of each of the battery cells of the second battery 841 in accordance with a command from the MPU 820, and detects a cell temperature of at least one of the battery cells through a thermistor (not shown) of the second battery 841. The AFE 843 executes a cell balancing process to even out remaining energies of the battery cells. The AFE 843 detects the temperature of a circuit board (hereinafter referred to as circuit board temperature) through another thermistor (not shown) on a circuit board. Further, the AFE 843 detects, through the shunt resistor 845, a second charge current flowing into the second battery 841 and a discharge current flowing out of the second battery 841. The AFE 843 converts detection values of the detected cell voltages, cell temperature, circuit board temperature, second charge current, and discharge current into respective digital signals and outputs the digital signals to the MPU 820.

The shunt resistor 845 is disposed in a current path connecting the second battery 841 and the second battery negative terminal 832.

The power supply circuit 827 includes a regulator. The power supply circuit 827 is supplied with an electric power from the second battery 841 when the battery voltage of the second battery 841 is a specified voltage. The power supply circuit 827 generates a power supply voltage VDD upon being supplied with the electric power from the second battery 841.

1-4. Charge Control Process (Charger and First Battery Pack)

The following describes the processes executed in the charger 600 and the first battery pack 100 during charging. Specifically, the following describes a charge control process executed by the device-side MPU 611 of the charger 600 and a charge condition setting process executed by the MPU 620 of the first battery pack 100 with reference respectively to the flowcharts in FIG. 3 and FIG. 4.

When connection to the first battery pack 100 is detected, the connection detected information Sb1 is inputted to the device-side MPU 611 through the interruption port PI. The device-side MPU 611 activates upon receipt of the connection detected information Sb1 and initiates the charge control process. When connection to the charger 600 is detected by the detector 300, the connection detected information Sa1 is inputted to the MPU 620 through interruption port PI. The MPU 620 activates upon receipt of the connection detected information Sa1, initiates operation in the normal operation mode, and initiates the charge condition setting process.

The charge control process by the device-side MPU 611 and the charge condition setting process by the MPU 620 are initiated around the same time and then executed in parallel.

Figure 3:
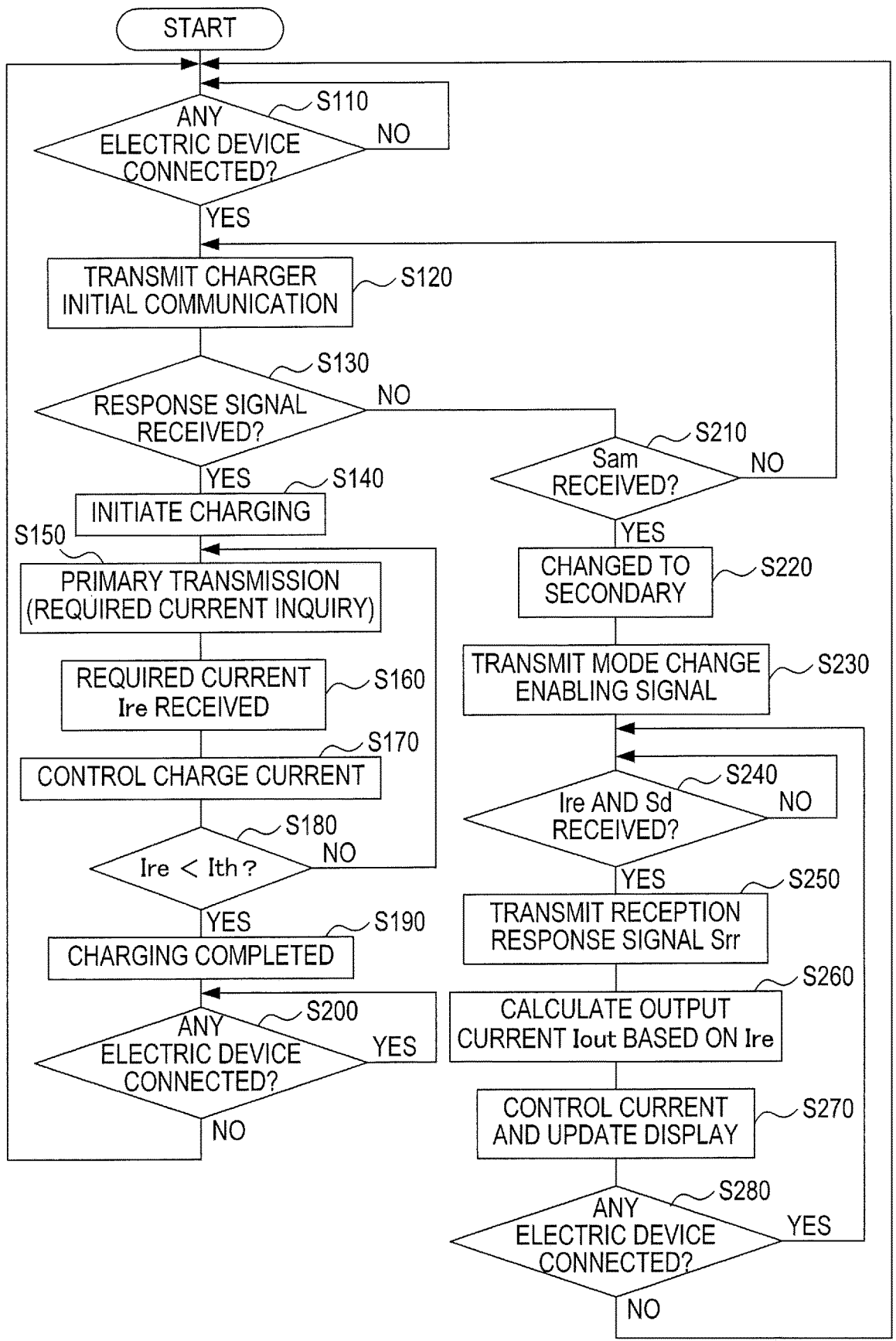
FIG. 3 is a flowchart showing a flow of a charge control process executed by a device-side MPU of the charger.

As shown in FIG. 3, when initiating the charge control process, the device-side MPU 611 first determines in S110 (S denotes step and the same applies hereinafter) whether there is any electric device connected to the charging system 1. If an affirmative determination is made in S110, the device-side MPU 611 proceeds to S120. If a negative determination in S110, the device-side MPU 611 repeatedly executes the same step to wait. In the present embodiment, an affirmative determination is made in S110 when the first battery pack 100 is connected. An affirmative determination is also made in S110, when the adapter 700 is connected as an example of the adapter.

When an affirmative determination is made in S110 and the process proceeds to S120, the device-side MPU 611 transmits a charger initial communication signal to the electric device. The charger initial communication signal is used for initial communication of the charger 600. At this time, the device-side MPU 611 transmits the charger initial communication signal to the first battery pack 100 through the device-side communicator 619. Specifically, the device-side MPU 611 transmits the charger initial communication signal as a primary (or leader) under a first communication protocol to the MPU 620 acting as a secondary (or follower). The communication protocol between the charger 600 and the first battery pack 100 will be also referred to as the first communication protocol in the description below.

Figure 4:
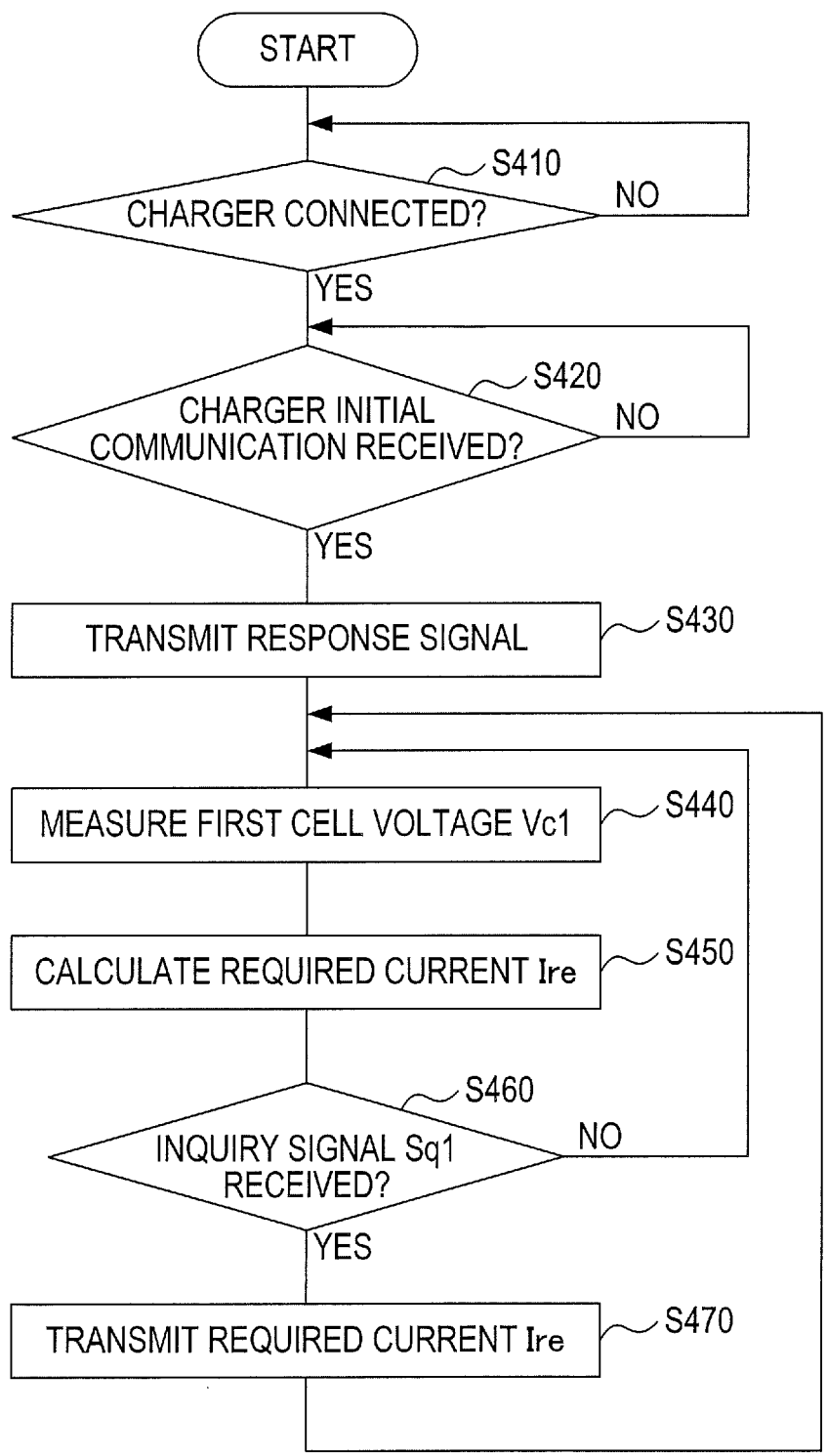
FIG. 4 is a flowchart showing a flow of a charge condition setting process executed by an MPU of the first battery pack.

As shown in FIG. 4, when initiating the charge condition setting process, the MPU 620 first determines in S410 whether the charger 600 is connected. If an affirmative determination is made in S410, the MPU 620 proceeds to S420. If a negative determination is made in S410, the MPU 620 repeatedly executes the same step to wait.

When an affirmative determination is made in S410 and the process proceeds to S420, the MPU 620 determines whether the initial communication signal has been received from the charger 600. If an affirmative determination is made in S420, the MPU 620 proceeds to S430. If a negative determination is made in S420, the MPU 620 repeatedly executes the same step to wait.

Subsequently in S430, the MPU 620 transmits a response signal to the charger 600 in response to the charger initial communication signal. At this time, the MPU 620 transmits the response signal to the charger 600 through the communicator 400.

Subsequently in S130, the device-side MPU 611 determines whether the response signal has been received from the first battery pack 100 in response to the charger initial communication signal. If an affirmative determination is made in S130, the device-side MPU 611 proceeds to S140. If a negative determination is made in S130, the device-side MPU 611 proceeds to S210. At this time, if the electric device connected to the charger 600 is the first battery pack 100, the response signal is transmitted to the charger 600. If the electric device connected to the charger 600 is the adapter 700, the adapter 700 does not transmit any response signal in response to the charger initial communication signal, and thus no response signal is transmitted to the charger 600.

When an affirmative determination is made in S130 and the process proceeds to S140, the device-side MPU 611 initiates charging of the first battery pack 100. Specifically, the device-side power supply circuit 613 initiates to output the first charge current to the first battery pack 100.

The device-side MPU 611 executes the process in S210 and the following steps in the charge control process after a negative determination is made in S130 if the adapter 700 is connected to the charger 600. This part of the charge control process will be described later.

Subsequently in S440, the MPU 620 measures a first cell voltage Vc1 of the battery 60. At this time, the MPU 620 acquires the first cell voltage Vc1 of the battery 60 through the AFE 610.

Subsequently in S450, the MPU 620 calculates a required current Ire that is equivalent to a first charge current Ich1 corresponding to the first cell voltage Vc1 of the battery 60. At this time, the MPU 620 calculates the required current Ire corresponding to the first cell voltage Vc1 using a calculation formula or map information, for example (hereinafter also referred to as calculation formula and the like). The calculation formula and the like are defined based on the correlation between the first cell voltage Vc1 and the first charge current Ich1. The calculation formula and the like are defined such that the value of the required current Ire decreases with an increase in the magnitude of the first cell voltage Vc1.

Subsequently in S460, the MPU 620 determines whether an inquiry signal Sq1 for the required current Ire has been received from the device-side MPU 611. If an affirmative determination is made in S460, the MPU 620 proceeds to S470. If a negative determination is made in S460, the MPU 620 proceeds to S440. The MPU 620 repeats the process of S440 to S460 until an affirmative determination is made in S460.

When proceeding to the subsequent S150, the device-side MPU 611 transmits the inquiry signal Sq1, as the primary in the communication with the MPU 620, to the MPU 620 acting as the secondary. At this time, the device-side MPU 611 makes an inquiry to the MPU 620 through the device-side communicator 619.

Upon receipt of the inquiry signal Sq1, the MPU 620 makes an affirmative determination in S460 and proceeds to S470 to transmit the required current Ire to the device-side MPU 611. At this time, the MPU 620 transmits the required current Ire by UART communication through the communicator 400 in response to the inquiry from the device-side MPU 611.

Subsequently in S160, the device-side MPU 611 receives the required current Ire as the response signal. At this time, the device-side MPU 611 waits until receiving the required current Ire. In other words, the device-side MPU 611, which executes S160, acquires the required current Ire from the first battery pack 100.

Subsequently in S170, the device-side MPU 611 controls the charge current outputted to the first battery pack 100 based on the received required current Ire. At this time, the device-side MPU 611 controls the device-side power supply circuit 613 such that the magnitude of the first charge current reaches that of the required current Ire.

Subsequently in S180, the device-side MPU 611 determines whether the magnitude of the received required current Ire is smaller than a specified completion determination value Ith (Ire<Ith). If an affirmative determination is made in S180, the device-side MPU 611 proceeds to S190. If a negative determination is made in S180, the device-side MPU 611 proceeds to S150. The device-side MPU 611 repeats the process of S150 to S180 until an affirmative determination is made in S180.

The completion determination value Ith is set to a determination value that is for determining whether charging of the electric device (for example, the first battery pack 100) connected to the charger 600 has been completed. In other words, the completion determination value Ith corresponds to a magnitude of the first charge current by which it is determined that charging of the charger 600 has been completed. For example, the completion determination value Ith may be set at 0 [A]. The completion determination value Ith corresponds to one example of the charge completion value of the present disclosure.

When an affirmative determination is made in S180 and the process proceeds to S190, the device-side MPU 611 determines that charging of the first battery pack 100 has been completed.

Subsequently in S200, the device-side MPU 611 determines whether any electric device is connected. If an affirmative determination is made in S200, the device-side MPU 611 repeatedly executes the same step to wait. If a negative determination is made in S200, the device-side MPU 611 proceeds to S110. In other words, an affirmative determination is made in S200 while the charged first battery pack 100 is connected to the charger 600, and a negative determination is made when the first battery pack 100 is removed from the charger 600.

In other words, the device-side MPU 611 determines whether the charged first battery pack 100 has been removed from the charger 600 by executing the process in S200. Upon removal of the first battery pack 100 from the charger 600, the device-side MPU 611 returns to S110 and repeatedly executes S110 to wait until another battery pack or another adapter is connected.

As described above, the charger 600 charges the first battery pack 100 by the device-side MPU 611 executing S110 to S200 of the charge control process and the MPU 620 executing the charge condition setting process.

1-5. Charge Control Process (Charging System and Second Battery Pack)

The following describes the processes respectively executed in the charger 600, the adapter 700, and the second battery pack 800 when the charging system 1 charges the second battery pack 800. Specifically, the following describes the charge control process executed by the device-side MPU 611 of the charger 600, an information transmission reception process executed by the adapter MPU 711 of the adapter 700, and a required current setting process executed by the MPU 820 of the second battery pack 800 with reference respectively to the flowcharts in FIG. 3, FIG. 5A, FIG. 5B, and FIG. 6.

When connection to the adapter 700 is detected, the connection detected information Sb1 is inputted to the device-side MPU 611 through the interruption port PI. The device-side MPU 611 activates upon receipt of the connection detected information Sb1 and initiates the charge control process. The adapter MPU 711 activates upon receipt of the power supply voltage VDD generated by the power supply circuit 713. The power supply circuit 713 generates the power supply voltage VDD upon being supplied with an electric power from the auxiliary power source 623 of the charger 600 through the first DS terminal 736. When the connection to the adapter 700 is detected by a connection determiner (not shown), the connection detected information Sa1 is inputted to the MPU 820 from the connection determiner through the interruption port PI. The MPU 820 activates upon receipt of the connection detected information Sa1 and initiates a required current output process.

The charge control process by the device-side MPU 611 and the information transmission reception process by the adapter MPU 711 are initiated around the same time and then executed in parallel. Subsequently, when the second battery pack 800 is connected to the adapter 700, the required current output process is initiated by the MPU 820, and then the required current output process is executed in parallel with the charge control process and the information transmission reception process.

As described above, when initiating the charge control process, the device-side MPU 611 determines in S110 whether there is any electric device connected to the charger 600. If an affirmative determination is made in S110, the device-side MPU 611 proceeds to S120. If a negative determination is made in S110, the device-side MPU 611 repeatedly executes the same step to wait. An affirmative determination is made in S110 when the adapter 700 is connected.

When an affirmative determination is made in S110 and the process proceeds to S120, the device-side MPU 611 transmits the charger initial communication signal used for the initial communication of the charger 600 to the adapter 700 through the device-side communicator 619. Specifically, the device-side MPU 611 transmits the charger initial communication signal as the primary under the first communication protocol to the adapter MPU 711 acting as the secondary. The first communication protocol between the charger 600 and the adapter 700 at this point is the same as the first communication protocol between the above-described the charger 600 and the first battery pack.

Figure 5A:
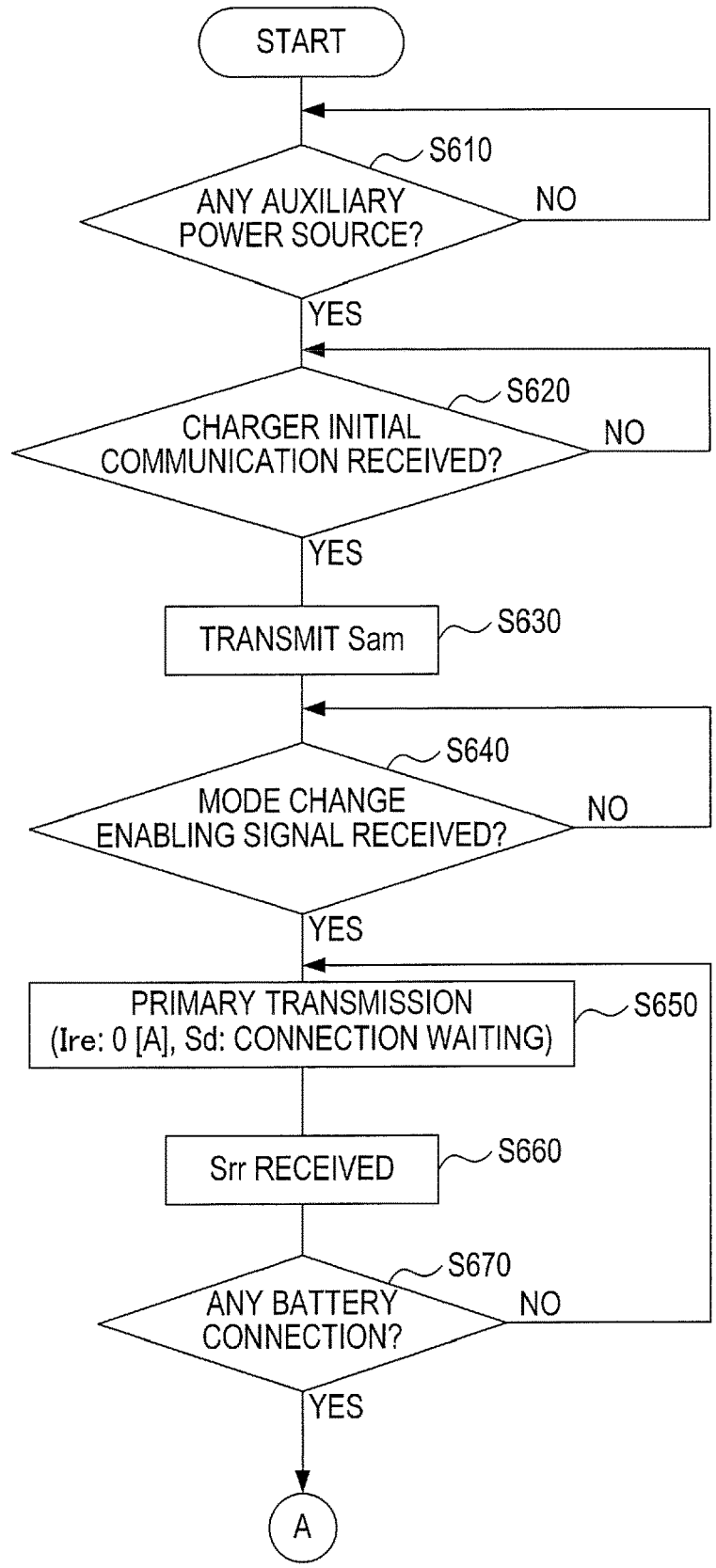
FIG. 5A is a flowchart showing a part of a flow of an information transmission reception process executed by an adapter MPU of the adapter.
Figure 5B:
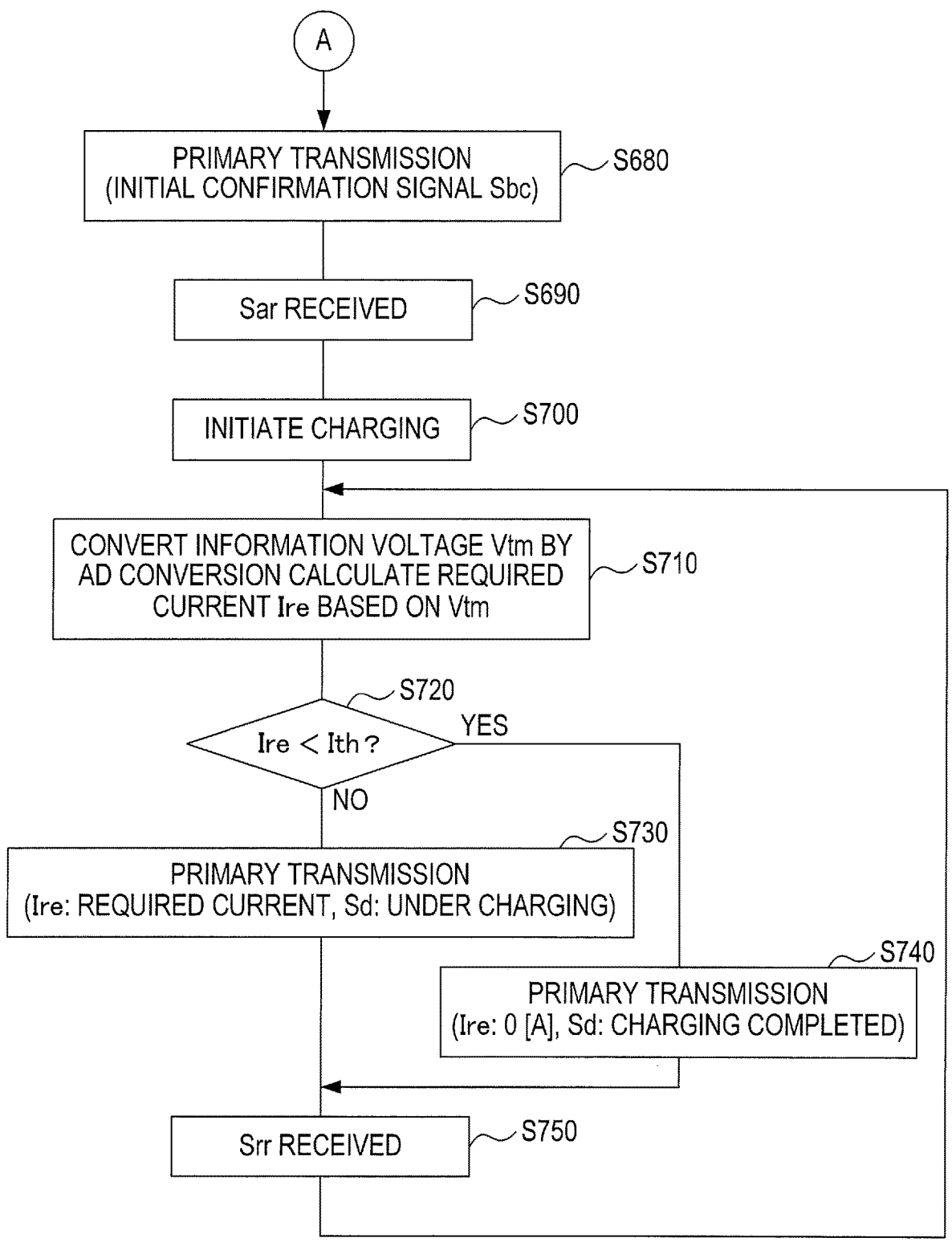
FIG. 5B is a flowchart showing the remainder of the flow of the information transmission reception process.

As shown in FIGS. 5A and 5B, when initiating the information transmission reception process, the adapter MPU 711 first determines in S610 whether the adapter MPU 711 is receiving an electric power from the auxiliary power source 623 of the charger 600. If an affirmative determination is made in S610, the adapter MPU 711 proceeds to S620. If a negative determination is made in S610, the adapter MPU 711 repeatedly executes the same step to wait. At this time, reception of the electric power from the auxiliary power source 623 is determined based on whether the power supply circuit 713 is outputting the power supply voltage VDD.

When an affirmative determination is made in S610 and the process proceeds to S620, the adapter MPU 711 determines whether the charger initial communication signal has been received from the charger 600. If an affirmative determination is made in S620, the adapter MPU 711 proceeds to S630. If a negative determination is made in S620, the adapter MPU 711 repeatedly executes the same step to wait.

When an affirmative determination is made in S620 and the process proceeds to S630, the adapter MPU 711 transmits an adapter primary mode command signal Sam to the charger 600. At this time, the adapter MPU 711 transmits the adapter primary mode command signal Sam to the charger 600 through the first adapter communicator 715 in the place of the response signal to the charger initial communication signal from the charger 600.

Subsequently in S130, the device-side MPU 611 determines whether any response signal to the charger initial communication signal has been received from the adapter 700. If an affirmative determination is made in S130, the device-side MPU 611 proceeds to S140. If a negative determination is made in S130, the device-side MPU 611 proceeds to S210. Since this section describes a case where the electric device connected to the charger 600 is the adapter 700, no response signal is transmitted to the charger 600.

When a negative determination is made in S130 and the process proceeds to S210, the device-side MPU 611 determines whether the adapter primary mode command signal Sam has been received from the adapter 700. If an affirmative determination is made in S210, the device-side MPU 611 proceeds to S220. If a negative determination is made in S210, the device-side MPU 611 returns to S120.

At this time, if the electric device connected to the charger 600 is not configured to output the response signal to the charger initial communication signal and the adapter primary mode command signal Sam, the device-side MPU 611 repeatedly executes the process of S120, S130, and S210 to wait.

When an affirmative determination is made in S210 and the process proceeds to S220, the device-side MPU 611 executes a process to change the device-side MPU 611 from the primary to the secondary in a second communication protocol with the adapter 700. Subsequently in S230, the device-side MPU 611 transmits a mode change enabling signal to the adapter 700 to permit a mode change to an adapter primary mode.

Subsequently in S640, the adapter MPU 711 determines whether the mode change enabling signal has been received from the charger 600. If an affirmative determination is made in S640, the adapter MPU 711 proceeds to S650. If a negative determination is made in S640, the adapter MPU 711 repeatedly executes the same step to wait.

When an affirmative determination is made in S640 and the process proceeds to S650, the adapter MPU 711 changes the protocol of the communication with the device-side MPU 611 from the first communication protocol to the second communication protocol. Under the first communication protocol, the device-side MPU 611 is assigned as the primary, while the adapter MPU 711 is assigned as the secondary for communication between the device-side MPU 611 and the adapter MPU 711. Under the second communication protocol, the adapter MPU 711 is assigned as the primary while the device-side MPU 611 is assigned as the secondary for communication between the device-side MPU 611 and the adapter MPU 711.

In S650, the adapter MPU 711 transmits a first command information to the device-side MPU 611. The first command information includes "0 [A] for the required current Ire" and "a display command signal Sd indicating a battery connection waiting state". In other words, the adapter MPU 711 transmits the required current Ire and the display command signal Sd under the second communication protocol to the device-side MPU 611.

Following S230, the device-side MPU 611 determines in S240 whether the required current Ire and the display command signal Sd have been received from the adapter 700. If an affirmative determination is made in S240, the device-side MPU 611 proceeds to S250. If a negative determination is made in S240, the device-side MPU 611 repeatedly executes the same step to wait.

When an affirmative determination is made in S240 and the process proceeds to S250, the device-side MPU 611 transmits a reception response signal Srr to the adapter MPU 711. The reception response signal Srr indicates receipt of the required current Ire and the display command signal Sd. At this time, the device-side MPU 611 transmits the reception response signal Srr to the adapter MPU 711 in accordance with the second communication protocol.

Subsequently in S260, the device-side MPU 611 calculates an output current Iout outputted to the adapter 700 based on the received required current Ire. For example, the device-side MPU 611 may determine the required current Ire as the output current Iout without any change. The device-side MPU 611 may correct the value of the required current Ire and determine the corrected value as the value of the output current Iout.

Subsequently in S270, the device-side MPU 611 controls the device-side power supply circuit 613 such that the magnitude of the current outputted to the adapter 700 reaches that of the output current Iout calculated in S260. In S270, the device-side MPU 611 also updates the information shown on a display (not shown) of the charger 600 based on the display command signal Sd. For example, the display shows: "Battery Waiting" if the display command signal Sd indicates "the battery connection waiting state"; "Charging" if the display command signal Sd indicates that "the battery is under charging"; and "Charge Completed" if the display command signal Sd indicates that "battery charging has been completed".

Subsequently in S280, the device-side MPU 611 determines whether any electric device is connected to the charger 600. If an affirmative determination is made in S280, the device-side MPU 611 proceeds to S240. If a negative determination is made in S280, the device-side MPU 611 returns to S110. In other words, in S280, the device-side MPU 611 makes an affirmative determination while the adapter 700 is connected to the charger 600, and makes a negative determination upon removal of the adapter 700 from the charger 600.

That is, while the adapter 700 is connected to the charger 600, the device-side MPU 611 makes an affirmative determination in S280 and repeatedly executes the process of S240 to S280. When the adapter 700 is removed from the charger 600, the device-side MPU 611 returns to S110 and repeatedly executes S110 to wait until another battery pack or another adapter is connected.

Following S650, the adapter MPU 711 receives in S660 the reception response signal Srr from the device-side MPU 611. At this time, the communication between the adapter MPU 711 and the device-side MPU 611 is conducted in accordance with the second communication protocol (primary: the adapter MPU 711, secondary: the device-side MPU 611), not the first communication protocol (primary: the device-side MPU 611, secondary: the adapter MPU 711).

Subsequently in S670, the adapter MPU 711 determines whether the second battery pack 800 is connected to the adapter 700. If an affirmative determination is made in S670, the adapter MPU 711 proceeds to S680. If a negative determination is made in S670, the adapter MPU 711 proceeds to S650. The adapter MPU 711 repeatedly executes the process of S650 to S670 to wait until the second battery pack 800 is connected to the adapter 700.

When an affirmative determination is made in S670 and the process proceeds to S680, the adapter MPU 711 transmits an initial confirmation signal Sbc to the second battery pack 800 in accordance with an adapter communication protocol. The adapter communication protocol defines to perform the primary-secondary type communication, and the communication procedure thereof is more simply defined than that of UART communication protocol. In the communication in S680, the adapter MPU 711 is the primary and the second battery pack 800 is the secondary. The initial confirmation signal Sbc is transmitted for confirming whether it is possible to transmit charge control data to the second battery pack 800. The adapter MPU 711 conducts the communication using the second adapter communicator 717 in accordance with the adapter communication protocol.

Figure 6:
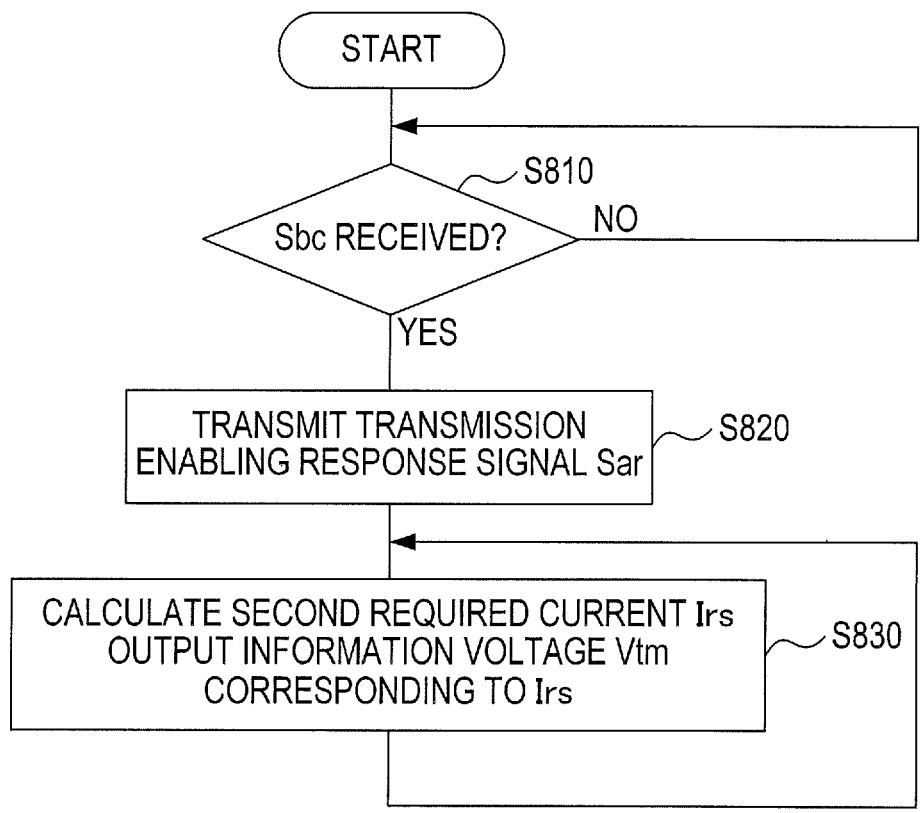
FIG. 6 is a flowchart showing a flow of a required current setting process executed by an MPU of the second battery pack.

Upon detection of the connection to the adapter 700 and initiation of the required current output process, the MPU 820 of the second battery pack 800 first determines in S810, as shown in FIG. 6, whether the initial confirmation signal Sbc has been received from the adapter MPU 711. If an affirmative determination is made in S810, the MPU 820 proceeds to S820. If a negative determination is made in S810, the MPU 820 repeatedly executes the same step to wait.

Subsequently in S820, the MPU 820 transmits a transmission enabling response signal Sar, indicating that it is possible to transmit the charge control data, to the adapter MPU 711.

Subsequently in S830, the MPU 820 calculates the second required current Irs that is equivalent to a second charge current Ich2 corresponding to a second cell voltage Vc2 of the second battery 841. At this time, the MPU 820 calculates the second required current Irs corresponding to the second cell voltage Vc2 using, for example, a calculation formula or map information (hereinafter also referred to as calculation formula and the like). The calculation formula and the like are defined based on the correlation between the second cell voltage Vc2 and the second charge current Ich2. The calculation formula and the like are defined such that the value of the second required current Irs decreases with an increase in the second cell voltage Vc2.

In S830, the MPU 820 also outputs an information voltage Vtm indicating the second required current Irs from the transmitter 825. Specifically, the MPU 820 outputs the information voltage Vtm in the form of an analog voltage from the transmitter 825 to the adapter 700 through the battery TM1 terminal 835.

The MPU 820 executes the process in S830 in every specified execution cycle to output the information voltage Vtm corresponding to the state of the second battery 841 to the adapter 700.

Following S680, the adapter MPU 711 receive in S690 the transmission enabling response signal Sar. At this time, the adapter MPU 711 waits until receiving the transmission enabling response signal Sar.

Subsequently in S700, the adapter MPU 711 determines that the second battery pack 800 is chargeable, and initiates charging of the second battery pack 800. Specifically, the adapter MPU 711 repeatedly executes the process of S710 to S750 described below to charge the second battery pack 800 using the electric power supplied from the charger 600.

Subsequently in S710, the adapter MPU 711 converts the information voltage Vtm by Analog to digital (A-D) conversion to acquire the information voltage Vtm in digital values. In S710, the adapter MPU 711 also calculates the required current Ire based on the information voltage Vtm. In this processing, the adapter MPU 711 calculates the second required current Irs indicated by the information voltage Vtm with the calculation formula and the like used in S830 by the MPU 820, and sets the calculation result as the required current Ire.

Subsequently in S720, the adapter MPU 711 determines whether the required current Ire is smaller than the predefined completion determination value Ith (Ire<Ith). If an affirmative determination is made in S720, the adapter MPU 711 proceeds to S740. If a negative determination is made in S720, the adapter MPU 711 proceeds to S730. The completion determination value Ith takes on a determination value for determining whether charging of the electric device (for example, the second battery pack 800) connected to the adapter 700 has been completed. For example, the completion determination value Ith may be set to 0 [A].

When a negative determination is made in S720 and the process proceeds to S730, the adapter MPU 711 transmits a second command information to the device-side MPU 611. The second command information includes "the required current Ire calculated in S710" and "the display command signal Sd indicating that the battery 841 is under charging". In the communication at this time, the adapter MPU 711 is the primary, and the device-side MPU 611 is the secondary.

When an affirmative determination is made in S720 and the process proceeds to S740, the adapter MPU 711 transmits a third command information to the device-side MPU 611. The third command information includes "the required current Ire indicating 0 [A]" and "the display command signal Sd indicating completion of battery charging". In the communication at this time, the adapter MPU 711 is the primary, and the device-side MPU 611 is the secondary.

In other words, the adapter MPU 711 executes S730 or S740 to transmit the required current Ire and the display command signal Sd to the device-side MPU 611 in accordance with the second communication protocol.

Upon receipt of the required current Ire and the display command signal Sd from the adapter MPU 711, the device-side MPU 611 makes an affirmative determination in S240, and, subsequently in S250, transmits the reception response signal Srr to the adapter MPU 711. In S260, the device-side MPU 611 calculates the output current Iout based on the received required current Ire. In S270, the device-side MPU 611 executes control such that the magnitude of the current outputted to the adapter 700 reaches that of the output current Iout, and updates the contents on the display (not shown) based on the display command signal Sd.

In other words, while repeatedly executing the process of S240 to S280, the device-side MPU 611 controls the current outputted to the second battery pack 800 through the adapter 700 based on the received required current Ire, and shows the state of the second battery pack 800 on the display (not shown) based on the display command signal Sd.

Following S730 or S740, the adapter MPU 711 receive in S750 the reception response signal Srr from the device-side MPU 611. The adapter MPU 711 thereby determines that the device-side MPU 611 has received the required current Ire and the display command signal Sd.

Then, the adapter MPU 711 repeatedly executes the process of S710 to S750 to repeatedly receive the second required current Irs corresponding to the information voltage Vtm from the second battery pack 800. Further, the adapter MPU 711 repeatedly transmits the required current Ire and the display command signal Sd corresponding to the second required current Irs to the charger 600.

As described above, execution of S240 to S280 of the charge control process by the device-side MPU 611, S710 to S750 of the information transmission reception process by the adapter MPU 711, and the required current setting process by the MPU 820 enables charging of the second battery pack 800 by the charging system 1 (specifically, the charger 600 and the adapter 700).

1-6. Changing Magnitude of First or Second Charge Current Corresponding to Variations in Required Current As described above, the charger 600 charges the first battery pack 100. During the charging that is specifically from confirmation of connection to the first battery pack 100 to completion of charging, the charger 600 communicates as the primary under the first communication protocol with the first battery pack 100 acting as the secondary. In this case, the charger 600 needs to transmit the inquiry signal Sq1 to the first battery pack 100 each time in order to receive the required current Ire from the first battery pack 100.

The required current Ire can be represented by two-byte digital data.

In the first communication protocol, the size of data transmitted from the primary to the secondary is determined to be 60 bytes. Thus, when the data including the inquiry signal Sq1 is transmitted from the charger 600 (i.e., primary) to the first battery pack 100 (i.e., secondary), the data needs to be 60 bytes.

Moreover, in the first communication protocol, the size of response data transmitted from the secondary to the primary is determined to be 84 bytes. Thus, when the response date including the required current Ire is transmitted from the first battery pack 100 (i.e., secondary) to the charger 600 (i.e., primary), the data needs to be 84 bytes.

Accordingly, the charger 600 needs data of 144 bytes (=60 bytes+84 bytes) to receive the required current Ire during charging of the first battery pack 100 by the charger 600.

The charging system 1 charges the second battery pack 800. In the stage to confirm the connection for this charging, the charger 600 communicates with the adapter 700 as the primary under the second communication protocol. Then, the charger 600 switches the roles of the primary and the secondary, and communicates with the adapter 700 as the secondary. The adapter 700, acting as the primary, repeatedly transmits the required current Ire to the charger 600. Thus, the charger 600 does not need to transmit the inquiry signal Sq1 to the adapter 700.

In the second communication protocol, the size of data transmitted from the primary to the secondary is determined to be 8 bytes. Thus, when the transmission data including the required current Ire is transmitted from the adapter 700 (i.e., primary) to the charger 600 (i.e., secondary), the data needs to be only 8 bytes.

In other words, 8-byte data is sufficient for the charger 600 to receive the required current Ire from the adapter 700 during charging of the second battery pack 800 by the charging system 1.

Transmission and reception of small sized data can be executed more frequently as compared with those of large sized data. Accordingly, the required current Ire can be transmitted from the adapter 700 to the charger 600 more frequently as compared with transmission of the required current Ire from the first battery pack 100 to the charger 600. The charger 600 thus can receive the required current Ire at short time intervals during charging of the second battery pack 800.

Thus, if a change in the second required current Irs needs to be promptly reflected to the output current (in other words, the second charge current) of the charger 600 during charging the second battery pack 800, the charging system 1 including the adapter 700 and the charger 600 should be used. Thereby, a change in the second required current Irs can be promptly reflected to the output current (in other words, the second charge current) of the charger 600.

1-7. Effects

As described above, in the charger 600, the device-side MPU 611 executes S120 and S130 to transmit and receive signals to/from the electric device connected to the charger 600 by means of the first digital communication in accordance with the first communication protocol and identify the type of the electric device. In other words, if an affirmative determination is made in S130, the device-side MPU 611 determines that the electric device is the first battery pack 100. If a negative determination is made in S130 and an affirmative determination is made in S210, the device-side MPU 611 determines that the electric device is the adapter 700.

In response to a determination that the electric device connected to the charger 600 is the first battery pack 100 (an affirmative determination in S130), the device-side MPU 611 executes the process of S140 to S200 to control the output current (in other words, the first charge current) outputted by the device-side power supply circuit 613. By executing the process of S140 to S200, the device-side MPU 611 receive the required current Ire from the first battery pack 100 by means of the first digital communication. The required current Ire received from the first battery pack 100 includes the first required value that corresponds to the magnitude of the first charge current required by the first battery pack 100. The required current Ire corresponds to one example of the first required information in the present disclosure. The magnitude of the required current Ire corresponds to one example of the first required value of the present disclosure.

In response to the determination that the electric device connected to the charger 600 is the adapter 700 (a negative determination in S130), the device-side MPU 611 executes the process of S240 to S280 to control the output current (in other words, the second charge current) outputted by the device-side power supply circuit 613.

The device-side MPU 611 executes the process of S240 to S280 to receive the required current Ire from the adapter 700 by means of the second digital communication in accordance with the second communication protocol, which differs from the first communication protocol. The required current Ire received from the adapter 700 includes the second required value. The second required value corresponds to the magnitude of the second charge current required by the adapter 700 for the second battery pack 800. The required current Ire corresponds to one example of the second required information of the present disclosure.

As described above, in the charger 600 of the present embodiment, a first minimum volume is 144 bytes. The first minimum volume corresponds to the volume of information required to be transmitted and received in order to acquire the first required information (in other words, the required current Ire) under the first communication protocol. Moreover, in the charger 600, a second minimum volume is 8 bytes. The second minimum volume corresponds to the volume of information required to be transmitted and received in order to acquire the second required information (in other words, the required current Ire) under the second communication protocol. In other words, in the charger 600, the second minimum volume is smaller than the first minimum volume.

When the charger 600 acquires the required current Ire from the adapter 700, the volume of information that needs to be transmitted and received can be reduced by use of the second communication protocol as compared with the case in which the first communication protocol is used. Accordingly, the time for the charger 600 to acquire the required current Ire (the second required information) from the adapter 700 can be reduced as compared with the time for the charger 600 to acquire the required current Ire (the first required information) from the first battery pack 100.

Accordingly, when outputting the second charge current to the adapter 700, the charger 600 can change the magnitude of the second charge current in a shorter cycle as compared with when the charger 600 outputs the first charge current to the first battery pack 100.

Thus, if the adapter 700 connected to the second battery pack 800 needs to vary the magnitude of the second charge current in a cycle shorter than for the first battery pack 100, the charger 600 can suitably vary the magnitude of the second charge current and thereby suitably output the second charge current to the adapter 700. In other words, the charger 600 can suitably vary the magnitude of the second charge current and suitably output the second charge current to the second battery pack 800 connected to the adapter 700.

Furthermore, the device-side MPU 611 executes S120, S130, and S210 to assign the primary role to the charger 600 and the secondary role to the electric device (the first battery pack 100 or the adapter 700), transmit and receive the signals in accordance with the first communication protocol, and determine the type of the electric device.

In response to the determination that the electric device is the adapter 700 based on the determination results in S130 and S210, the device-side MPU 611 executes S220 and S230 to change the digital communication between the charger 600 and the adapter 700 to the second digital communication. At this time, the device-side MPU 611 assigns the secondary role to the charger 600 and the primary role to the adapter 700 and changes the digital communication to the second communication.

Use of the charger 600 enables transmission of the required current Ire from the adapter 700 (i.e., primary) to the charger 600 (i.e., secondary) (S240, S730, and S740) without making an inquiry on the required current Ire (the second required information) from the charger 600 to the adapter 700. In other words, since the required current Ire can be acquired without inquiring the adapter 700, it is possible to reduce the time for the charger 600 to acquire the required current Ire and to increase the frequency to acquire the required current Ire in per unit time.

Due to the charger 600, the increase in the frequency of acquisition of the required current Ire in per unit time enables prompt variation in the magnitude of the second charge current, inhibiting a delay in controlling the second charge current in response to a change in the state of the adapter 700 or the second battery pack 800.

Further, the charging system 1 includes the charger 600 and the adapter 700. The charging system 1 charges the second battery pack 800. The adapter 700 is connected to the charger 600 and to the second battery pack 800. The adapter 700 outputs the second charge current from the charger 600 to the second battery pack 800.

Accordingly, use of the adapter 700 enables the charger 600 to charge the second battery pack 800 even if the second battery pack 800 is unable to perform the first digital communication and the second digital communication.

The charging system 1 thus enables charge of the second battery pack 800 that cannot be charged by the charger 600 alone. Moreover, when the second battery 800 is charged using the adapter 700 and the magnitude of the second charge current needs to be varied in a cycle shorter than for the first battery pack 100, the charger 600 can suitably vary the magnitude of the second charge current for the second battery pack 800.

The first battery pack 100 outputs the required current Ire (the first required information) by means of the first digital communication. The first battery pack 100 thus can be directly connected to the charger 600 and charged.

In the adapter 700, the adapter MPU 711 executes S710 and thereby receives the information voltage Vtm from the second battery pack 800. The information voltage Vtm is an analog voltage indicating the second required current Irs of the second battery pack 800. The second required current Irs is the required value for the second charge current in the second battery pack 800. The adapter MPU 711 executes S730 or S740 to output the required current Ire, which is the second required information, to the charger 600 by means of the second digital communication.

In other words, in the charging system 1, the first battery pack 100 can be charged by direct connection of the charger 600 to the first battery pack 100, and the second battery pack 800 can be charged by connection of the charger 600 to the second battery pack 800 via the adapter 700. Accordingly, the charging system 1 can charge both the first battery pack 100 and the second battery pack 800 that are different types of batteries from each other.

The adapter MPU 711 executes S710 and thereby receives the second required current Irs (the required value for the second charge current) in the second battery pack 800 through the receiver 719 by means of analog communication.

In analog communication, the information voltage Vtm (the required value for the second charge current) received from the second battery pack 800 is updated in real time, and thus the adapter MPU 711 can promptly receive the second required current Irs from the second battery pack 800. The adapter MPU 711 outputs the required current Ire to the charger 600 in S730 or S740 based on the second required current Irs received in S710 so as to transmit the required value for the second charge current in the second battery pack 800 to the charger 600.

Thus, in the charging system 1, the required value for the second charge current can be transmitted in a short term from the second battery pack 800 to the charger 600 through the adapter 700, which enables update of the output value for the second charge current in the charger 600 at short time intervals.

Generally in digital communication, update of the required value for the second charge current in a short term may be difficult since setting a short data transmission cycle increases processing load in the data transmission process. In contrast, the required value for the second charge current in the second battery pack 800 is transmitted by means of analog communication in the charging system 1, enabling update of the required value for the second charge current in a short term.

1-8. Corresponding Relations of Terms

The following describes the corresponding relation of the terms.

The device-side power supply circuit 613 corresponds to one example of the current outputter of the present disclosure. The first battery pack 100 corresponds to one example of the first device of the present disclosure. The adapter 700 corresponds to one example of the second device of the present disclosure. The second battery pack 800 corresponds to one example of the third device of the present disclosure.

The device-side MPU 611 that executes S120, S130, and S210 corresponds to one example of the device identifier of the present disclosure. The device-side MPU 611 that executes the process of S140 to S200 corresponds to one example of the first charge controller of the present disclosure. The device-side MPU 611 that executes the process of S240 to S280 corresponds to one example of the second charge controller of the present disclosure. The device-side MPU 611 that executes S180 corresponds to one example of the completion determiner of the present disclosure.

The adapter MPU 711 and the receiver 719 that execute S710 correspond to one example of the information receiver the present disclosure. The adapter MPU 711 and the first adapter communicator 715 that execute S730 or S740 correspond to one example of the information outputter of the present disclosure. The auxiliary power source 623 corresponds to one example of the power source of the present disclosure. The MPU 620 corresponds to one example of the device controller of the present disclosure. The device-side positive terminal 61, the device-side negative terminal 62, the device-side DT terminal 64, the device-side TR terminal 65, and the device-side DS terminal 66 correspond to one example of the plurality of terminals of the present disclosure.

2. Other Embodiments

Embodiments of the present disclosure have been described hereinabove. However, the present disclosure is not limited to the above-described embodiments. The present disclosure can be embodied in various forms without departing from the spirit of the present disclosure.

(2a) The above-described embodiment describes a configuration in which the adapter 700 is provided as the second device; however, a battery pack (hereinafter also referred to as third battery pack) may be provided as the second device. The third battery pack communicates with the charger 600 in accordance with the first communication protocol from when being connected to the charger 600 until when the communication protocol is changed, and then the protocol for the communication with the charger 600 may be changed to the second communication protocol. This enables the charger 600 to charge at least two types of battery packs that is the first battery pack 100 and the third battery pack without using the adapter 700.

(2b) The above-described embodiment describes a configuration in which the second required current Irs is transmitted from the second battery pack 800 to the adapter 700 using the information voltage Vtm in the form of an analog signal. The way to transmit the second required current Irs is not limited to this manner. The second required current Irs may be transmitted from the second battery pack 800 to the adapter 700 using a digital signal, for example.

(2c) The above embodiment describes a configuration in which serial communication is adopted for the communication method between the first battery pack (the communicator 400) and the charger 600, and between the adapter 700 (the communicator 400) and the charger 600. The communication method, however, is not limited to the serial communication, and other communication methods such as parallel communication and multiplex communication may be adopted.

(2d) Functions of one component in the above-described embodiments may be distributed to two or more components. Functions of two or more components may be integrated and achieved by one component. At least a part of the configurations of the above-described embodiments may be replaced with known configurations having the same functions. A part of the configurations of the above-described embodiments may be omitted. At least a part of the configurations of above-described embodiments may be added to or replaced with other configurations of another one of the above-described embodiments. Any and all modes that are encompassed in the technical ideas identified by the languages in the claims are embodiments of the present disclosure.

What is claimed is:

1. A charging system comprising:
a charger including:
a device-side power supply circuit configured to selectively output either a first charge current or a second charge current to an electric device electrically connected to the charger, the device-side power supply circuit being configured to convert an AC power into a DC power to generate either the first charge current or the second charge current;
an auxiliary power source configured to supply an electric power to the electric device;
a device-side Micro Processing Unit (MPU) configured to execute a charge control process, the charge control process including:
determining whether the electric device is connected to the charger;
identifying the electric device in accordance with a first communication protocol in response to the electric device being determined to be connected to the charger, the first communication protocol defining a first digital communication, the first communication protocol requiring at least a first minimum volume of communication to acquire a first required information from a first battery pack, the first communication protocol defining that the charger is assigned as a primary and the electric device is assigned as a secondary, the primary being defined to control the secondary, and the secondary being defined to operate in accordance with the primary;
receiving the first required information from the first battery pack in accordance with the first communication protocol in response to the electric device being identified as the first battery pack, the first required information including a first required value, and the first required value corresponding to a magnitude of the first charge current required by the first battery pack;
controlling, in response to the electric device being identified as the first battery pack, the magnitude of the first charge current through the device-side power supply circuit such that the magnitude of the first charge current reaches the first required value;
receiving, in response to the electric device being identified as an adapter, a second required information from the adapter in accordance with a second communication protocol, the second required information including a second required value, the second required value corresponding to a magnitude of the second charge current required by the adapter, the second communication protocol being different from the first communication protocol, the second communication protocol defining a second digital communication, the second communication protocol requiring at least a second minimum volume of communication to acquire the second required information from the adapter, the second minimum volume being smaller than the first minimum volume, and the second communication protocol defining that the charger is assigned as the secondary and the adapter is assigned as the primary;
controlling, in response to the electric device being identified as the adapter, the magnitude of the second charge current through the device-side power supply circuit such that the magnitude of the second charge current reaches the second required value;
determining whether a charge completion condition is fulfilled based on the first required information, the charge completion condition being fulfilled in response to the first required value being smaller than a charge completion value, and the charge completion value corresponding to the magnitude of the first charge current by which charging performed by the charger is determined to be completed; and
determining whether the electric device is still connected to the charger in response to the charge completion condition being determined to be fulfilled; and
the adapter configured to be electrically connected to the charger and a second battery pack, the adapter being configured to output the second charge current received from the charger to the second battery pack.

2. A charger comprising:
a current outputter configured to selectively output either a first charge current or a second charge current to an electric device electrically connected the charger;
a first charge controller configured to control the first charge current in response to the electric device being a first device, the first charge controller being configured to receive a first required information from the first device in accordance with a first communication protocol, the first required information including a first required value, the first required value corresponding to a magnitude of the first charge current required by the first device, the first communication protocol defining a first digital communication, and the first communication protocol requiring at least a first minimum volume of communication to acquire the first required information from the first device; and
a second charge controller configured to control the second charge current in response to the electric device being a second device, the second charge controller being configured to receive a second required information from the second device in accordance with a second communication protocol, the second required information including a second required value, the second required value corresponding to a magnitude of the second charge current required by the second device, the second communication protocol being different from the first communication protocol, the second communication protocol defining a second digital communication, the second communication protocol requiring at least a second minimum volume of communication to acquire the second required information from the second device, and the second minimum volume being smaller than the first minimum volume.

3. The charger according to claim 2, further comprising a device identifier configured to identify, in accordance with the first communication protocol, the electric device electrically connected to the charger, wherein the first charge controller is configured to control the first charge current in response to the device identifier identifying the electric device as the first device, and wherein the second charge controller is configured to control the second charge current in response to the device identifier identifying the electric device as the second device.

4. The charger according to claim 2, wherein the first communication protocol defines that the charger is assigned as a primary and the electric device is assigned as a secondary, the primary being defined to control the secondary, and the secondary being defined to operate in accordance with the primary, and wherein the second communication protocol defines that the charger is assigned as the secondary and the second device is assigned as the primary.

5. The charger according to claim 2, wherein the first charge controller is configured to control the current outputter such that the magnitude of the first charge current reaches the first required value.

6. The charger according to claim 2, further comprising a completion determiner configured to determine whether a charge completion condition is fulfilled based on the first required information, wherein the charge completion condition is fulfilled in response to the first required value being smaller than a charge completion value, and wherein the charge completion value corresponds to the magnitude of the first charge current by which charging performed by the charger is determined to be completed.

7. The charger according to claim 2, wherein the current outputter is configured to convert an AC power into a DC power to generate either the first charge current or the second charge current.

8. The charger according to claim 2, wherein the electric device includes a device controller configured to control the electric device, and wherein the charger further includes a power source configured to supply an electric power to the device controller.

9. The charger according to claim 2, further comprising terminals configured to be electrically connected to the electric device.

10. A charging system comprising:

a charger including:
  a current outputter configured to selectively output either a first charge current or a second charge current to an electric device electrically connected to the charger;
  a first charge controller configured to control the first charge current in response to the electric device being a first device, the first charge controller being configured to receive a first required information from the first device in accordance with a first communication protocol, the first required information including a first required value, the first required value corresponding to a magnitude of the first charge current required by the first device, the first communication protocol defining a first digital communication, and the first communication protocol requiring at least a first minimum volume of communication to acquire the first required information from the first device; and
  a second charge controller configured to control the second charge current in response to the electric device being a second device, the second charge controller being configured to receive a second required information from the second device in accordance with a second communication protocol, the second required information including a second required value, the second required value corresponding to a magnitude of the second charge current required by the second device, the second communication protocol being different from the first communication protocol, the second communication protocol defining a second digital communication, the second communication protocol requiring at least a second minimum volume of communication to acquire the second required information from the second device, and the second minimum volume being smaller than the first minimum volume; and an adapter configured to be electrically connected to the charger and a third device, the adapter being assigned as the second device, and the adapter being configured to output the second charge current outputted from the charger to the third device.

11. The charging system according to claim 10, wherein the charger further includes a device identifier configured to identify, in accordance with the first communication protocol, the electric device being electrically connected to the charger, wherein the first charge controller is configured to control the first charge current in response to the device identifier identifying the electric device as the first device, and wherein the second charge controller is configured to control the second charge current in response to the device identifier identifying the electric device as the second device.

12. The charging system according to claim 10, wherein the first device includes a first battery configured to output the first required information in accordance with the first communication protocol, wherein the third device includes a second battery, and wherein the adapter includes:
  an information receiver configured to receive the second required value from the third device; and
  an information outputter configured to output the second required information to the charger in accordance with the second communication protocol, the second required information including the second required value received by the information receiver.

13. The charging system according to claim 12, wherein the information receiver is configured to receive an analog signal indicating the second required value.

14. The charging system according to claim 10, wherein the charger further includes terminals configured to be electrically connected to the electric device.

15. A method for controlling a charge current, the method comprising:

receiving a first required information from a first device in accordance with a first communication protocol in response to the first device being connected to a charger, the first required information including a first required value, the first required value corresponding to a magnitude of a first charge current required by the first device, the first communication protocol defining a first digital communication, and the first communication protocol requiring at least a first minimum volume of communication to acquire the first required information from the first device;

receiving a second required information from a second device in accordance with a second communication protocol in response to the second device being connected to the charger, the second required information including a second required value, the second required value corresponding to a magnitude of a second charge current required by the second device, the second communication protocol being different from the first communication protocol, the second communication protocol defining a second digital communication, the second communication protocol requiring at least a second minimum volume of communication to acquire the second required information from the second device, and the second minimum volume being smaller than the first minimum volume; and selectively outputting, from the charger, either the first charge current based on the first required value or the second charge current based on the second required value.

* * * * *